United States Patent [19]
Shelton

[11] Patent Number: 4,589,522

[45] Date of Patent: May 20, 1986

[54] CHAIR FOR TREE STAND AND THE LIKE

[76] Inventor: Dennis L. Shelton, 333 El Dorado St., Lakeland, Fla. 33805

[21] Appl. No.: 757,535

[22] Filed: Jul. 22, 1985

[51] Int. Cl.$^4$ .................. A01M 31/02; A47F 3/26; A47C 9/10

[52] U.S. Cl. .................................... 182/187; 108/152

[58] Field of Search ................. 182/187, 188; 108/152

[56] References Cited

U.S. PATENT DOCUMENTS

| | | | |
|---|---|---|---|
| 2,851,085 | 9/1958 | Woodward | 182/187 |
| 3,065,821 | 11/1962 | Hundley | 182/187 |
| 3,419,108 | 12/1968 | Mobbs | 182/187 |
| 3,730,294 | 5/1973 | Thurmond | 182/187 |
| 3,871,482 | 3/1975 | Southard | 182/187 |
| 4,120,379 | 10/1978 | Carter | 182/187 |
| 4,411,335 | 10/1983 | Forrester | 182/187 |
| 4,474,265 | 10/1984 | Shinkle | 182/187 |
| 4,475,627 | 10/1984 | Eastridge | 182/187 |
| 4,493,395 | 1/1985 | Rittenhouse | 182/187 |

*Primary Examiner*—Reinaldo P. Machado
*Attorney, Agent, or Firm*—Stein, Reese & Prescott

[57] ABSTRACT

The invention comprises a chair adapted to be used in conjunction with or retrofitted to a tree stand or the like. More particularly, the chair comprises a pair of legs supported in an angled, upright position by means of a pivotable support link. A crossmember maintains the legs in their spaced-apart position. The crossmember is positioned below the upper ends of the legs. The seat portion of the chair of the invention comprises a substantially U-shaped member including a pair of legs. The ends of the legs of the U-shaped member are pivotably connected to the ends of the chair legs, respectively. The back and seating portion of the seat of the invention comprises a length of a flexible material, such as canvas, which member forms a seat portion. The upper end of the flexible member is secured above the height of the chair by means of a rope or the like.

11 Claims, 5 Drawing Figures

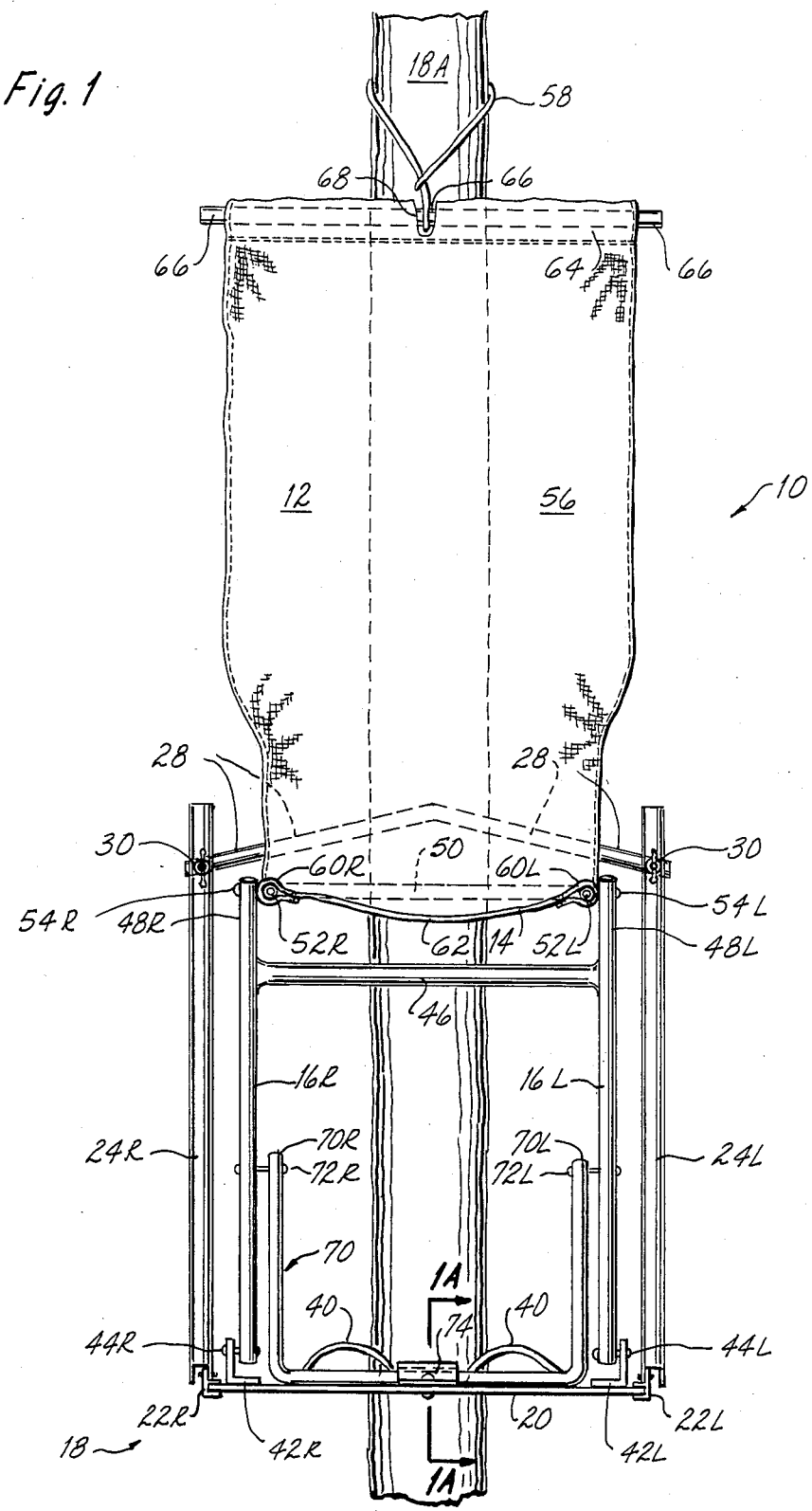

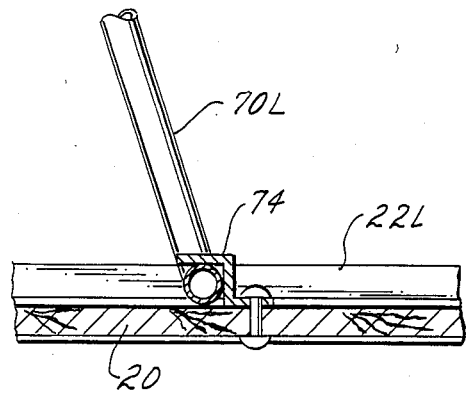
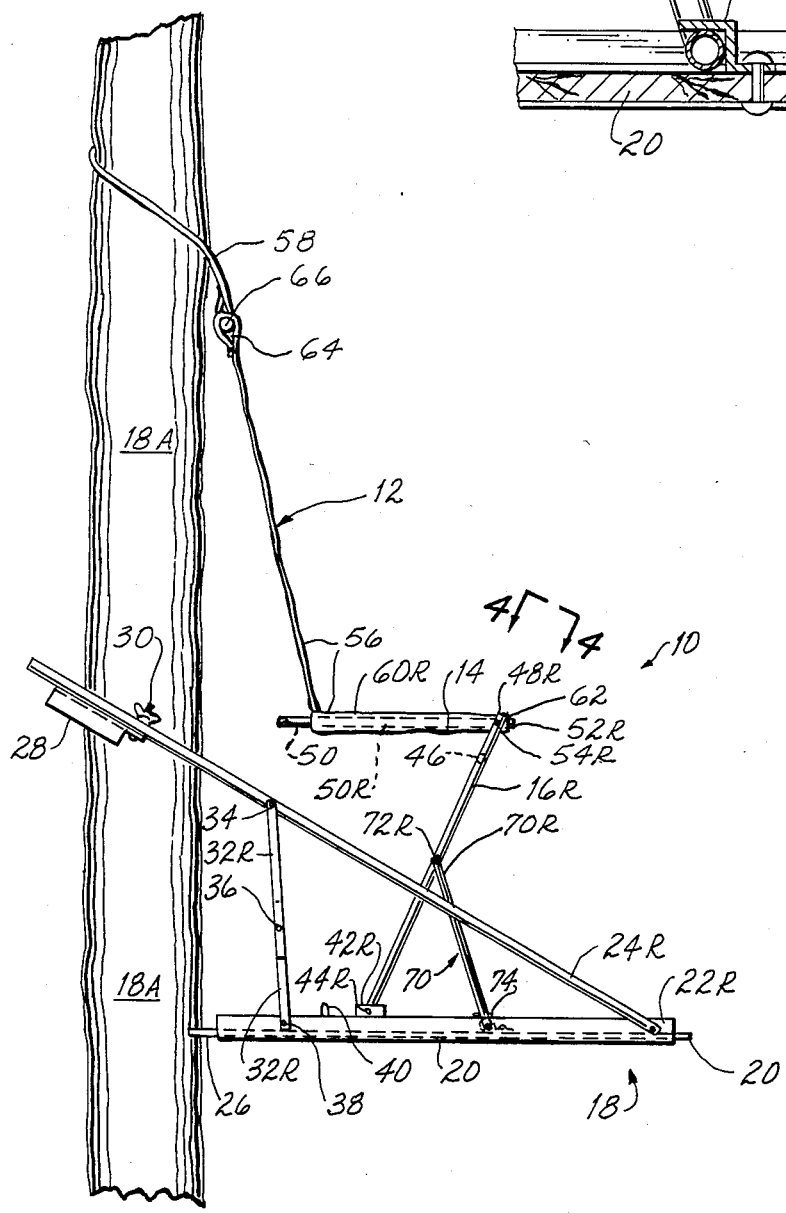

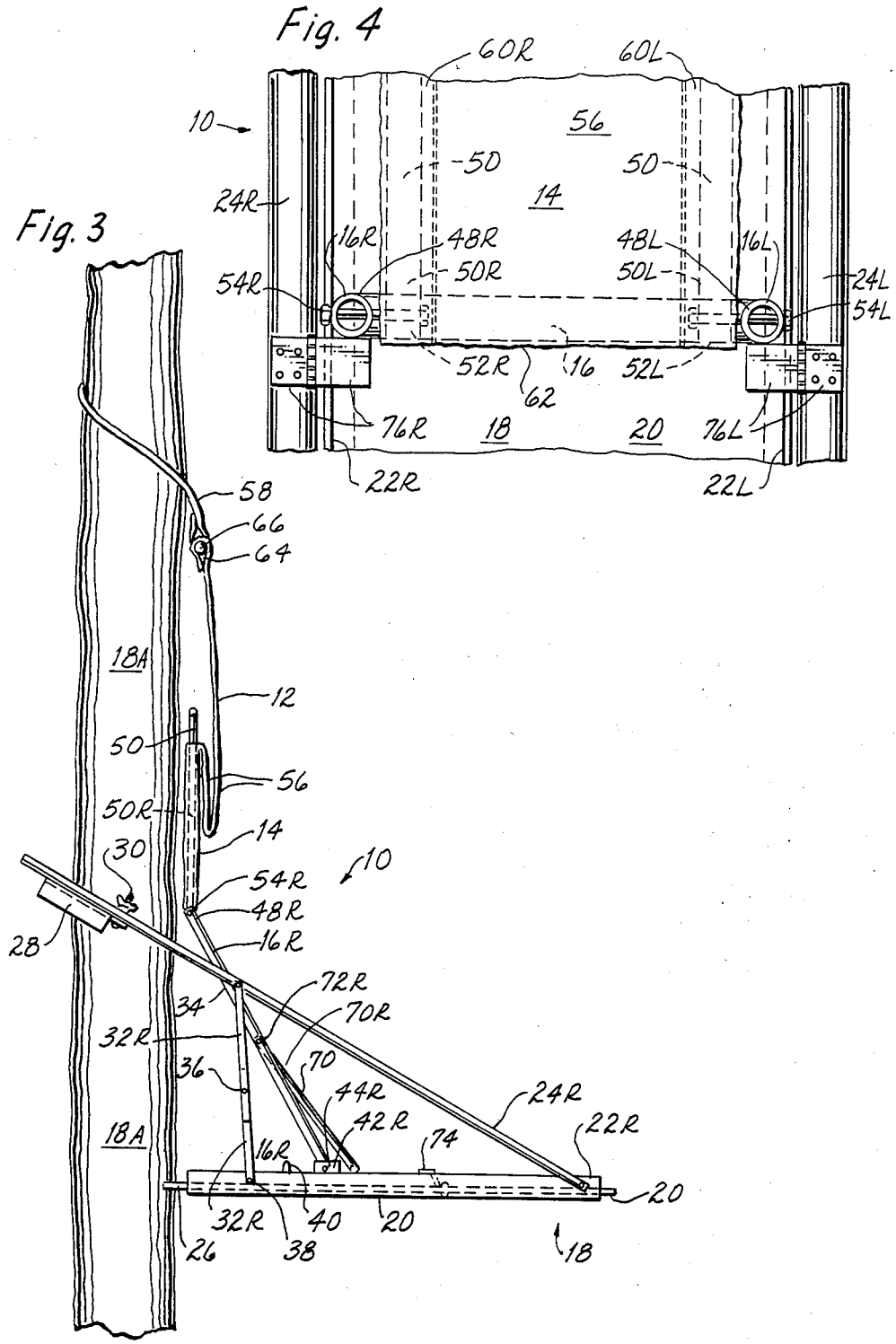

CHAIR FOR TREE STAND AND THE LIKE

BACKGROUND OF THE INVENTION

1. Field of the Invention

This invention relates to chairs for use in conjunction with tree stands and the like. More particularly, this invention relates to chairs adaptable to tree stands and characterized as providing comfortable seating to the sportsman such that the sportsman may sit in the chair for prolonged periods of time without fatigue or discomfort.

2. Description of the Background Art

Presently, there exists numerous types and styles of tree stands designed to allow a sportsman to be seated in and elevated from the ground. The elevated position in the tree provides extended visibility of the surrounding area to the sportsman. Additionally, the elevated position in the tree's foliage positions the sportsman out of the normal field of view of most animals, such that the animals do not visually detect the presence of the sportsman.

The most prevalent type of tree stand consists of a platform which is supported by the tree, or the tree limbs, and which is designed to allow the sportsman to sit, crouch or stand on the platform. Some platforms are designed to be hoisted up the tree and then strapped to the tree to support the sportsman. For example, U.S. Pat. No. 4,411,335 discloses a tree stand which is hauled up the tree by the hunter via a collapsible ladder and then affixed to the tree by means of a plurality of prongs which engage into the bark of the tree and a pair of chains positioned around the trunk of the tree to hold the tree stand tightly against the trunk. The tree stands comprises a cushioned seat portion on which the hunter sits and a small foot platform on which the sportsman could stand.

U.S. Pat. No. 3,871,482 discloses another tree stand designed to be hauled up a tree and then affixed thereto by means of a chain or the like. The tree stand includes a foldable seat to provide seating to the sportsman and a platform on which the sportsman can stand. U.S. Pat. No. 3,513,940 discloses a collapsible tree stand consisting only of a seat portion. U.S Pat. No. 3,065,821 discloses still another tree stand consisting of a seat and a platform for sitting and standing of the sportsman. Finally, U.S. Pat. No. 4,475,627 discloses a tree stand having a platform and a collapsible seat. This collapsible seat is designed to be folded up to allow the sportsman to stand on the full area of the platform.

The patents briefly discussed above disclose variations on the most prevalent types of tree stands. It is evident from review of those patents that a primary objective of each tree stand is to provide comfortable seating for the sportsman and to provide a platform of sufficient size to allow the sportsman to stand thereon and move about. One major disadvantage to each of the above described patents is the lack of a back member to the seat to provide back support to the sportsman. Without back support, it is evident that the sportsman will become fatigued in a relatively short period of time. Even leaning back against the bark of the tree would not adequately provide relief because of the rough texture and hard surface of the tree bark.

U.S. Pat. No. 4,474,265 discloses a tree stand which includes a chair having a back member which provides support to the sportsman's back. More specifically, the chair of this patent includes a length of padding secured at one end to a crossmember of the chair and at the other end to an upper portion of the tree. The length of padding functions to cushion the sportsman's back against the bark of the tree when seated. Unfortunately, the crossmember of this chair tends to cut off the blood circulation to the sportsman's legs. Further, the length of padding causes the sportsman to gradually slip out of the seat. As a result, the sportsman must continually exert pressure on his legs in order to remain in the seat.

Therefore, it is an object of this invention to provide an apparatus which overcomes the aforementioned inadequacies of the prior art devices and provides an improvement which is a significant contribution to the advancement of the tree stand chair art.

Another object of this invention is to provide a chair for a tree stand or the like which provides for comfortable seating to the sportsman over extended periods of time without adversely affecting the blood flow to his legs and without requiring him to exert force via his legs to remain in the seat.

Another object of this invention is to provide a chair for a tree stand or the like which provides back support to the sportsman to increase the amount of time that the sportsman can sit in the chair without fatigue.

Another object of this invention is to provide a chair for a tree stand or the like including a back member which provides support to the sportsman's back without requiring the sportsman to rest against the trunk of the tree.

Another object of this invention is to provide a chair for a tree stand or the like which is collapsible, thereby allowing the chair and the tree stand to be easily hauled up the selected tree site and assembled.

Another object of this invention is to provide a chair for a tree stand or the like in which the chair can be folded up and pivoted out of the way to allow the sportsman full, unrestricted mobility on the platform of the tree stand.

Another object of this invention is to provide a chair for a tree stand or the like which can be economically manufactured and sold as a kit to be retrofitted to existing portable or fixed tree stands.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a chair adapted to be used in conjunction with or retrofitted to a tree stand or the like. More particularly, the chair comprises a pair of legs supported in an angled, upright position by means of a pivotable support link. A crossmember maintains the legs in their spaced-apart position. The crossmember is positioned below the upper ends of the legs for the purpose discussed hereinafter. The seat portion of the chair of the invention comprises a substantially U-shaped member including a pair of legs. The ends of the legs of the U-shaped member are pivotably connected to the ends of the chair legs, respectively.

The back and seating portion of the seat of the invention comprises a length of a flexible material, such as canvas, which is affixed along its lower sides to the legs of the U-shaped member to form a seat portion. The upper end of the flexible member is then secured above the height of the chair by means of a rope or the like.

The chair of the invention as briefly discussed above is adaptable to virtually any type of tree stand having a platform. Indeed, the chair of the invention may be sold in a kit form to be retrofitted to existing tree stands already purchased or constructed by the sportsman.

The seat of the invention is characterized as providing comfortable seating to the sportsman over extended periods of time while allowing the sportsman to pivot the chair upwardly, out of the way, thereby providing the sportsman fully mobility while standing on the platform of the tree stand. The comfortability of the seat of the invention is enhanced by pivotably connecting the U-shaped member to the upper ends of the chair legs and positioning the crossmember downwardly from the upper ends of the chair legs. As a result of this configuration, the sportsman's legs do not rest upon the cross member and yet the weight of the sportsman is fully supported by the U-shaped member. Moreover, the U-shaped member provides a relatively flat seating area for the sportsman unlike other tree stands which simply consist of a length of padding on which the sportsman sits. Consequently, blood flow to the sportsman's legs is assured and the tendency for the sportsman to slide out of the chair is minimized.

While the chair of the invention is described for use specifically in conjunction with a tree stand, it should be understood that the chair invention can be used in many other applications. For example, the lower ends of the chair legs may be provided with spikes for insertion into the ground. The upper end of the flexible material providing the back and seat portion of the chair can be supported by a tripod or other support; for example, suspended by a rope, hung hammock-like, from a tree or tree limb. The sportsman, consumer or other user can then comfortably utilize the seat in a more conventional manner while camping or participating in other outdoor activities. Accordingly, for the purposes of this discussion and in the claims appended hereto, it shall be understood that the seat of the invention has many applications and is not limited to tree stands.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a front view of the chair of the invention adapted to a conventional tree stand.

FIG. 1A is a partial enlarged view of FIG. 1 along lines 1A—1A illustrating the bracket which secures the support leg to the platform of the tree stand.

FIG. 2 is a left side view of the chair of the invention adapted to a tree stand illustrating the manner in which the chair legs are supported in an upright, angled position by means of the support leg.

FIG. 3 is a side view of the chair of the invention adapted to a tree stand with the chair moved to its retracted position.

FIG. 4 is an enlarged partial view of FIG. 2 along lines 4—4 illustrating an alternative means for securing the chair legs in an upright, angled position.

Similar reference characters refer to similar parts throughout the several views of the drawings.

DETAILED DESCRIPTION OF THE PREFERRED EMBODIMENT

Referring to FIGS. 1 and 2, the chair 10 of the invention basically comprises a back portion 12 and a seat portion 14 supported by a pair of upstanding chair legs 16. The chair 10 is adapted to be connected to a tree stand, generally indicated by the numeral 18, or the like.

The conventional tree stand 18 comprises a platform 20 having angled side members 22L and 22R positioned along its length. A pair of elongated support members 24L and 24R are pivotably connected from the front end of the side members 22L and 22R, respectively, in a spaced-apart condition to span the diameter of the tree 18A. The rear end 26 of the platform 20 includes a V-configuration to center the platform 20 against the trunk of the tree 18A. The V-configuration may include an angled member having its edge sharpened to engage into the bark of the tree. The rearward end of the support members 24L and 24R include a corresponding removable V-member 28 adapted to be positioned on the other side of the tree 18A. V-member 28 is removably and adjustably connected to the ends of the support members 24L and 24R by threaded fasteners 30 or the like. A pair of support links 32L and 32R support the support members 24L and 24R in their upright, angled position as shown in Fig. 2. The support links 32L and 32R are pivotable at pivot points 34, 36 and 38 allowing the support members 24L and 24R to be collapsed downwardly and positioned along the length of the angled side members 22L and 22R for convenient transport by the sportsman. A strap (not shown) may be provided to allow the sportsman to carry the tree stand 18 on his back.

The tree stand 18 is used by simply positioning the V-configuration of the rear end 26 of the platform 20 against the tree 18A and then extending and locking in place the support members 24L and 24R via support links 32L and 32R. V-member 28 is then positioned on the other side of the tree 18A and affixed in place by means of threaded fasteners 30. The sportsman stands on the platform 20 and inserts his feet into two loops of elastic cord 40. The sportsman ascends the tree 18A by grasping the tree 18A with his arms and then lifting his legs, allowing the tree stand 18 to "crawl" up the tree 18A. This process is repeated until the tree stand 18 is positioned at the desired elevation on the tree's trunk. The tree stand 18 remains in position due to the locking feature of the V-member 28 and the V-configuration of rear end 26 of the platform 20 about the tree 18A.

The chair legs 16 of the chair 10 of the invention are pivotably connected at their lower end to the platform 20 by means of angle brackets 42L and 42R and pivot pins 44L and 44R which allow the chair legs 16 to freely pivot relative to the platform 20. The chair legs 16 are secured at their upper end in a spaced-apart manner by means of a crossmember 46. The cross member 46 may be bolted or welded to the chair legs 16 without departing from the spirit and scope of this invention. The crossmember 46 is positioned appreciably below the upper end 48 of the chair legs 16 to assure that the blood flow of the sportsman's legs is not impeded when the sportsman is seated in the seat portion 14 of the chair 10.

The seat portion 14 of the chair 10 of the invention comprises a substantially U-shaped member 50 constructed from a section of tubing or the like and including a pair of side legs 50L and 50R. The ends 52L and 52R of the side legs 50L and 50R are pivotably connected to the upper ends 48L and 48R of the chair legs 16L and 16R, respectively, by means of pivot pins 54L and 54R.

A length of flexible member 56 is affixed to the U-shaped member 50 at its lower end and to a rope 58 or the like at its upper end. More particularly, the flexible member 56 includes, at its lower side edges, a pair of stitched casings 60L and 60R for receiving the side legs 50L and 50R of the U-shaped member 50. The stitched casings 60L and 60R, together with the side legs 50L and 50R of the U-shaped member 50, assure that a wide seating area will be provided to the sportsman for comfortable seating thereon. Moreover, the downward positioning of the crossmember 46 from the edge 60 of the flexible member 56 assures that the sportsman's legs will not rest upon the cross member 46 but, rather, be comfortably supported by the edge 62 of the flexible member 56.

The upper end of the flexible member 56 includes another stitched casing 64 through which is positioned a rigid rod 66 or the like. Rope 58 is then secured at the mid-section of the rod 66 via aperture 68 in the stitched casing 64. Rope 58 may then be secured to the trunk of the tree 18A thereby providing a hammock-like support for the sportsman's back with the rod 66 assuring that the flexible member 56 will remain in an open or spread position to comfortably mate itself to the sportsman's back.

Referring to FIG. 1 again, the chair legs 16L and 16R of the chair 10 of the invention are supported in their angled, upright position by means of a support leg 70. In its preferred embodiment, the support leg 70 comprises an inverted U-shaped configuration having ends 70L and 70R pivotably connected to the midsection of chair legs 16L and 16R by means of pivot pins 72L and 72R. The support leg 70 is affixed relative to the platform 20 by means of bracket 74 (see FIG. 2A). During use, the support leg 70 is pivoted from its aligned position with the chair legs 16L and 16R to an extended position whereupon the support leg 70 engages under bracket 74. When secured in this manner, the support leg 70 assures that the chair legs 16L and 16R will remain in their upright, angled position as shown in FIG. 2.

Many alternatives may be substituted for the support leg 70 discussed above. For example, as shown in FIG. 4, means may be provided to rigidly lock the chair legs 16L and 16R to the support members 24L and 24R of the tree stand 18. More particularly, a pair of angled members 76L and 76R may be pivotably connected to the support members 24L and 24R of the tree stand 18 and pivoted outwardly to engage the mid-portion of the chair legs 16L and 16R, thereby securing the chair legs 16L and 16R in their upright, angled position.

The chair 10 of the invention is operable to be folded out of the way to allow the sportsman free mobility on the platform 20 of the tree stand 18. As shown in FIG. 3, the chair 10 is folded out of the way by simply moving the chair legs 16L and 16R rearwardly while pulling up on the U-shaped member 50 until the U-shaped member 50 rests against the tree 18A. Reversing the above steps and locking the support leg 70 into bracket 74 produces a chair 10 once again for comfortable seating by the sportsman.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,

What is claimed is:

1. A chair for a tree stand or the like, comprising in combination:
    a flexible member defining a back portion and a seat portion, said seat portion including side edges and front edge and said back portion including an upper end;
    a substantially U-shaped member including left and right side legs;
    means for connecting said side edges of said seat portion of said flexible member to said left and right side legs of said U-shaped member;
    left and right chair legs, each having upper ends;
    means for pivotably connecting said upper ends of said left and right chair legs to said left and right side legs of said U-shaped member, respectively;
    means for securing said chair legs in a spaced-apart position from one another; and
    means for suspending said back portion of said flexible member above said seat portion of said flexible member.

2. The chair as set forth in claim 1, further including means for supporting said chair legs in a substantially upright position.

3. The chair as set forth in claim 2, wherein said tree stand comprises an upwardly angled support member adapted to be secured to a tree and wherein said support means comprises a pair of pivotable memmbers connected to said support members an engagable position with said members, respectively, to support said chair legs.

4. The chair as set forth in claim 2, wherein said support means comprises a support leg extending angularly from one of said chair legs.

5. The chair as set forth in claim 4, wherein said chair legs are pivotably connected to a platform of the tree stand and wherein said support leg engages a bracket affixed to said platform.

6. The chair as set forth in claim 5, wherein said support leg is substantially U-shaped and includes left and right portions which pivotably connect to said chair legs, respectively.

7. The chair as set forth in claim 5, wherein said connecting means comprises forming a stitched casing in said side edges of said seat portion of said flexible member for receiving said left and right side legs of said U-shaped member.

8. The chair as set forth in claim 1, wherein said suspension means comprises a rope means connected to said upper end of said back portion of said flexible member for affixing to a tree or the like.

9. The chair as set forth in claim 8, wherein said upper end of said back position includes a stitched casing and a rod inserted therethrough for connection to said rope means.

10. The chair as set forth in claim 1, wherein said securing means comprises a crossmember interconnecting said chair legs.

11. The chair as set forth in claim 10, wherein said coressmember is positioned appreciably below said front edge of said seat portion of said flexible member.

* * * * *